(12) United States Patent
Dicke et al.

(10) Patent No.: US 8,380,632 B2
(45) Date of Patent: Feb. 19, 2013

(54) METHOD AND SYSTEM FOR UPSELLING TO A USER OF A DIGITAL BOOK LENDING LIBRARY

(76) Inventors: Ronald Dicke, Ottawa (CA); Gordon Freedman, Ottawa (CA)

( * ) Notice: Subject to any disclaimer, the term of this patent is extended or adjusted under 35 U.S.C. 154(b) by 0 days.

(21) Appl. No.: 13/160,839

(22) Filed: Jun. 15, 2011

(65) Prior Publication Data

US 2011/0313892 A1 Dec. 22, 2011

Related U.S. Application Data

(60) Provisional application No. 61/355,258, filed on Jun. 16, 2010.

(51) Int. Cl.
*G06Q 30/00* (2012.01)
(52) U.S. Cl. ............... 705/59; 705/51; 726/27
(58) Field of Classification Search .............. 705/51, 705/59; 726/27
See application file for complete search history.

(56) References Cited

U.S. PATENT DOCUMENTS

| | | | | |
|---|---|---|---|---|
| 6,901,386 | B1 * | 5/2005 | Dedrick et al. ................. | 705/59 |
| 2001/0049648 | A1 * | 12/2001 | Naylor et al. .................... | 705/37 |
| 2005/0027846 | A1 * | 2/2005 | Wolfe et al. .................... | 709/223 |
| 2007/0201702 | A1 * | 8/2007 | Hendricks et al. ............ | 380/282 |
| 2007/0255580 | A1 * | 11/2007 | Cole et al. ......................... | 705/1 |
| 2009/0055288 | A1 * | 2/2009 | Nassimi .......................... | 705/26 |
| 2009/0260067 | A1 * | 10/2009 | Racabi .............................. | 726/7 |
| 2010/0262515 | A1 * | 10/2010 | Brewer .......................... | 705/27 |
| 2011/0078050 | A1 * | 3/2011 | Schwartz ..................... | 705/27.1 |
| 2011/0302009 | A1 * | 12/2011 | Freed et al. ................. | 705/14.16 |

FOREIGN PATENT DOCUMENTS

| WO | WO02/39206 A2 | * | 5/2002 |
|---|---|---|---|
| WO | WO2011/049999 | * | 4/2011 |

OTHER PUBLICATIONS

Chadwell ("What's Next for Collection Management and Managers? User-Centered Collection Management", The Valley Library, Oregon State University, 2009, 11 pages).*

* cited by examiner

*Primary Examiner* — James D Nigh
(74) *Attorney, Agent, or Firm* — Freedman & Associates

(57) ABSTRACT

A method is disclosed where an e-book lending library is provided. The lending library includes data relating to one of license data relating to a plurality of e-books and a plurality of e-books. A request to borrow a first e-book of the plurality of e-books for a predetermined finite period of time is received at the e-book lending library. A current lending status of the first e-book is determined as one of available for lending and unavailable for lending. When it is determined that the first e-book is unavailable for lending, a second signal is transmitted to the user via the communication network, the second signal comprising an offer to sell to the user the first e-book via the e-book lending library.

29 Claims, 4 Drawing Sheets

METHOD AND SYSTEM FOR UPSELLING TO A USER OF A DIGITAL BOOK LENDING LIBRARY

FIELD OF THE INVENTION

The instant invention relates generally to digital books or e-books, and more particularly to a system and method for upselling to a user of a digital book lending library.

BACKGROUND OF THE INVENTION

A digital book, which is also known as an electronic book or an e-book, is the digital media equivalent of a conventional printed book. Typically, digital books are structured as virtual frames presented on a display device. During a reading session a user may turn or change from one virtual frame or "page" to another. Advantageously, the "pages" are not fixed permanently, and may be redefined or repaginated based on variances in display conditions, such as screen size, font type or size, margins, line spacing, resolution, etc.

Conveniently, digital books may be read on personal computers, personal digital assistants (PDAs), smart phones, etc., or on dedicated hardware devices known as e-book readers or e-book devices. Another convenience that is associated with digital books is the ability to purchase and download, or download and store, a reading selection directly from a digital library or commercial site. Some e-book readers, such as for instance Amazon's Kindle 2, use a 3G wireless network to allow the user to download digital books directly to the device, even if a Wi-Fi hotspot is not available. Other devices that can be "repurposed" for reading digital books, such as for instance Apple's IPod Touch, achieve similar functionality using a local wireless network connection.

Digital books currently offer several advantages over conventional printed books. For instance: text can be searched automatically and cross-referenced using hyperlinks; font size and font type can be customized; non-permanent highlighting and annotation is supported; animated images or multimedia clips are supported; reading can resume automatically at the last read page, etc. In addition, a single e-book reader containing the text of several digital books is easier to carry around than the same books in printed form. Furthermore, the backlit display of an e-book reader allows reading in low light, or even in total darkness.

Of course, lending libraries of digital books are known. For instance, many public libraries currently allow registered patrons to borrow digital books via a library webpage. In this type of system the patron typically borrows a digital book from the lending library for a predetermined finite period of time, such as for instance 21 days, after which time the digital book is returned automatically to the digital book lending library. In practice, the digital book is made available for being displayed to the patron during the predetermined finite period of time, such as for instance via an electronic device that is associated with the patron. Once the predetermined finite period of time has elapsed the digital book is no longer accessible using the electronic device, unless of course the patron "renews" the loan. Advantageously, digital libraries offer their patrons the convenience of being able to borrow digital books at any time, usually twenty-four hours a day and seven days a week, without having to ever enter a physical branch of the library. In addition, patrons do not need to be concerned about incurring late return fees, since the digital books are returned automatically at the end of the loan period.

A digital book lending library also shares some features in common with traditional bricks-and-mortar libraries. For example, when one patron is using a license that is associated with a digital book, then that digital book is not available for being loaned to any other patron until after it has been "returned." Instead, when another patron requests the digital book they may be offered the option of placing a "hold" on the requested digital book. At some later time the patron that placed the hold is notified that the requested digital book has become available, at which time that patron either may "check-out" the digital book or release the hold if they no longer require the digital book. It is therefore a disadvantage that digital book lending libraries currently offer only a limited number of copies of each digital book for being loaned during any particular period of time. The need to place a "hold" when a requested digital book is unavailable diminishes the convenience that is normally associated with digital book lending libraries, and may cause patrons simply to forgo reading certain digital books. Furthermore, it is a disadvantage that a patron may not be able to renew the loan of a digital book if another patron has placed a "hold." In particular, the digital book may be returned automatically at the end of a current loan period, even if the patron has not finished reading the book. In this case, the patron either must wait until the book becomes available again or simply miss reading the rest of the book.

It would be advantageous to provide a system and method that overcomes at least some of the above-mentioned limitations of the prior art.

SUMMARY OF EMBODIMENTS OF THE INVENTION

In accordance with an aspect of the instant invention there is provided a method comprising: providing an e-book lending library comprising a library interface and a database containing at least one of license data relating to a plurality of e-books and a plurality of e-books; receiving at the e-book lending library via a communication network a first signal transmitted from a user, the first signal comprising a request to borrow a first e-book of the plurality of e-books for a predetermined finite period of time; determining a current lending status of the first e-book as one of available for lending and unavailable for lending; and, when it is determined that the first e-book is unavailable for lending, transmitting to the user via the communication network a second signal, the second signal comprising an offer to sell to the user the first e-book via the e-book lending library. Some embodiments comprise: determining based on at least one of the license and the e-book what to offer to the user, the offer including at least the offer to sell and an other offer based on data associated with at least one of the license and the e-book, and providing the other offer to the user.

In accordance with an aspect of the instant invention there is provided a method comprising: displaying to a user via a display portion of an electronic device a plurality of different e-book selections, each different e-book selection being representative of an e-book contained in an e-book lending library; receiving from the electronic device via a communication network a first signal indicative of user selection of one of the displayed e-book selections, the first signal comprising a request to borrow from the e-book lending library an e-book that is represented by the selected one of the displayed e-book selections; determining if the requested e-book is currently available for being loaned; and, when it is determined that the requested e-book is not currently available for being loaned, transmitting to the user via the communication network a second signal, the second signal comprising an offer to sell to the user the requested e-book.

In accordance with an aspect of the instant invention, there is provided a system comprising: a first storage element for storing e-book content relating to a plurality of different e-books, the plurality of different e-books comprising an e-book lending library; a second storage element for storing at least one lending license in association with each e-book of the plurality of different e-books; a third storage element for storing at least one purchase license in association with each e-book of the plurality of different e-books; and, a processor for, in response to a request from a user to borrow one of the plurality of different e-books from the e-book lending library, determining whether a lending license associated with the requested e-book is currently available, and for: providing the requested e-book to the user when it is determined that the lending license associated with the requested e-book is currently available; and, offering to the user an opportunity to purchase the at least one purchase license associated with the requested e-book when it is determined that the lending license associated with the requested e-book is other than currently available.

In accordance with an aspect of the instant invention, there is provided a method comprising: displaying to a user via a display portion of an electronic device a plurality of different e-book selections, each different e-book selection being representative of an e-book contained in an e-book store; receiving from the electronic device via a communication network a first signal indicative of user selection of one of the displayed e-book selections, the first signal comprising a request to purchase from the e-book store an e-book that is represented by the selected one of the displayed e-book selections; determining if the requested e-book is currently available for being loaned from an e-book lending library; and, when it is determined that the requested e-book is currently available for being loaned, transmitting to the user via the communication network a second signal, the second signal comprising an offer to loan to the user the requested e-book from the e-book lending library.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
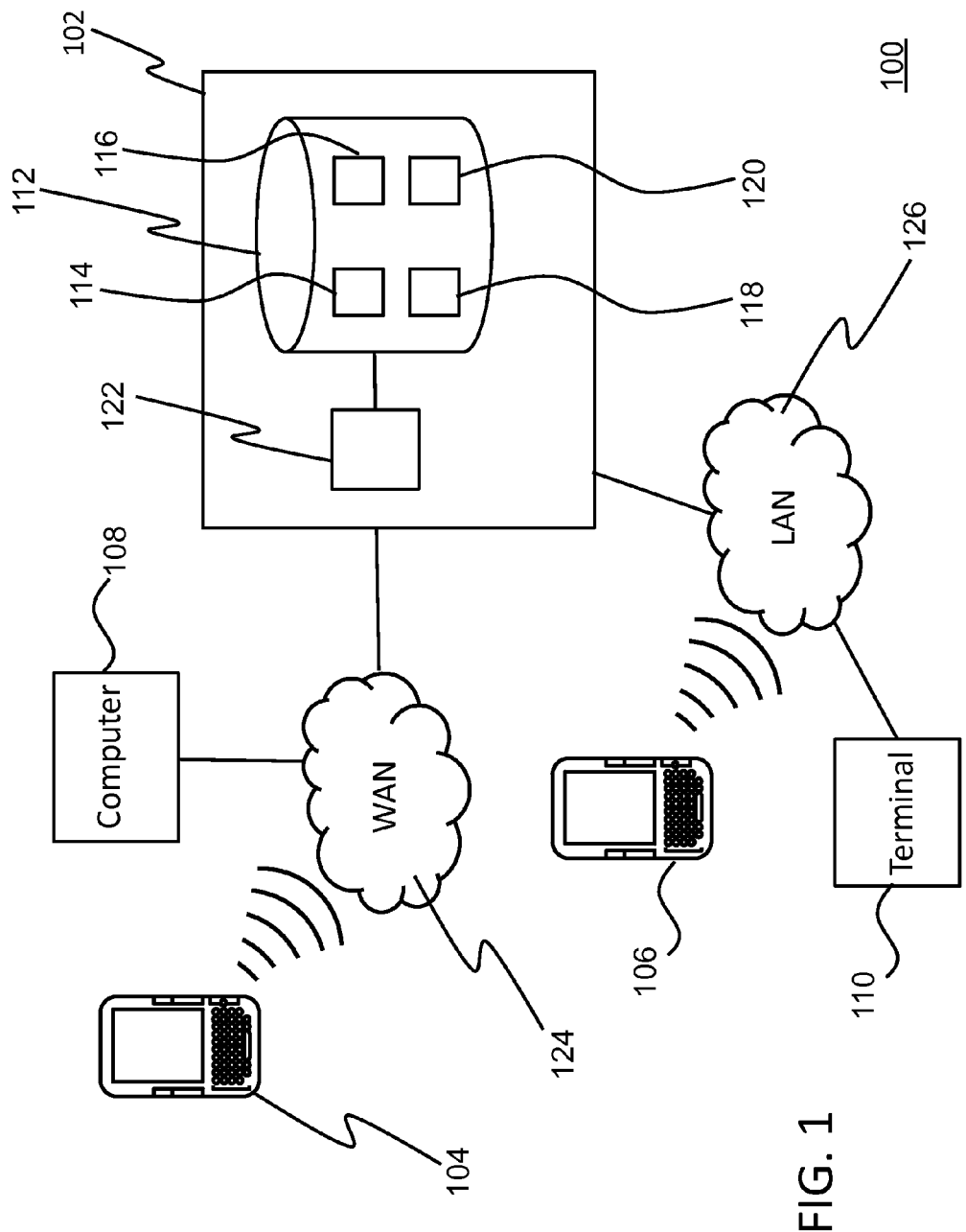
FIG. 1 is a simplified block diagram showing a system according to an embodiment of the instant invention.

Referring to FIG. 1, shown is a simplified block diagram of a system 100 according to an embodiment of the instant invention. System 100 includes an e-book lending library 102 and a plurality of user devices including portable electronic devices 104 and 106, personal computer 108, and terminal 110. The e-book lending library 102 further includes a data storage system 112 for storing: e-book content 114; e-book lending licenses 116; e-book purchase licenses 118; and, library patron data 120. Additionally, the e-book lending library 102 includes a processor 122 having in execution thereon at least a process for controlling functions of the e-book lending library 102. Optionally, the data storage system 112 comprises a plurality of separate data storage devices (not shown) for storing the e-book content 114, the e-book lending licenses 116, the e-book purchase licenses 118, and the library patron data 120.

During use an e-book that is requested by a user is provided to the portable electronic device 104 or to the computer 108 via a wide area network (WAN) 124, such as for instance the Internet, or is provided to the portable electronic device 106 or to the terminal 110 via local area network 126. A registered patron may access the e-book lending library 102 via WAN 124 using the portable electronic device 104 or the computer 108 from virtually anywhere that an Internet connection is available. Additionally, portable electronic device 104 optionally connects to WAN 124 via a WI-FI network, via Bluetooth, or via a cellular network. On the other hand, the registered patron must be present in an actual library branch in order to access the e-book lending library 102 via LAN 126 using the portable electronic device 106 or the terminal 110. The portable electronic device 106 may connect to LAN 126 via a WI-FI network, via a WI-FI access point, or via Bluetooth within the library branch.

Referring still to FIG. 1, the e-book lending library 102 includes at least one "instance" of each of a plurality of different e-books. In particular, each e-book that is stored in e-book content 114 of data storage system 112 is associated with at least one lending license that is stored in e-book lending licenses 116 of data storage system 112. By way of a specific and non-limiting example, a separate lending license is required for each e-book instance. In this case, the e-book lending library 102 is required to purchase three separate lending licenses for a first e-book in order to be authorized to lend three instances of the first e-book during overlapping periods of time. When all three lending licenses have been provided to different users, then the first e-book is unavailable temporarily for being loaned. Since the number of lending licenses associated with the first e-book is limited, a user must wait for one of the three instances of the first e-book to be "returned" to the e-book lending library 102 before they are able to borrow the first e-book. Generally, an e-book is loaned to a patron for a predetermined finite period of time—the loan period—such as for instance 14 days or 21 days, although any arbitrary loan period may be defined. On the other hand, the number of purchase licenses that are stored in e-book purchase licenses 118 of data storage system 112 may or may not be limited.

Operation of the system that is shown in FIG. 1 will now be described by way of a specific and non-limiting example, in which a user uses the portable electronic device 104 to access the e-book lending library 102 via WAN 124. In particular, the user provides a request message via a data input portion of the portable electronic device 104. The request message includes an indication of a first e-book that the user wishes to borrow from the e-book lending library 102, as well as user identification information for authenticating the user to the e-book lending library 102, such as for instance at least two of a library card number, a user name, and a password. According to one embodiment, a plurality of different e-book selections is displayed to the user via a display portion of the portable electronic device 104. For instance, a plurality of icons, each icon representing a different e-book selection, is displayed via a touch-sensitive screen portion of the portable electronic device 104. The icons are human intelligible, such as for instance an image of the cover art of an e-book that is represented by the e-book selection. In general, an e-book selection is a menu item representing an e-book that is stored in the e-book lending library 102, and it is selectable by the user for initiating a request to borrow the e-book that is represented by the e-book selection. In this example, the user may provide an indication for selecting one of the displayed e-book selections simply by touching the touch-sensitive screen of the portable electronic device 104. Optionally, the e-book selection is displayed in another human intelligible form, such as for instance the text of the title of the e-book that is represented by the e-book selection.

Figure 2:
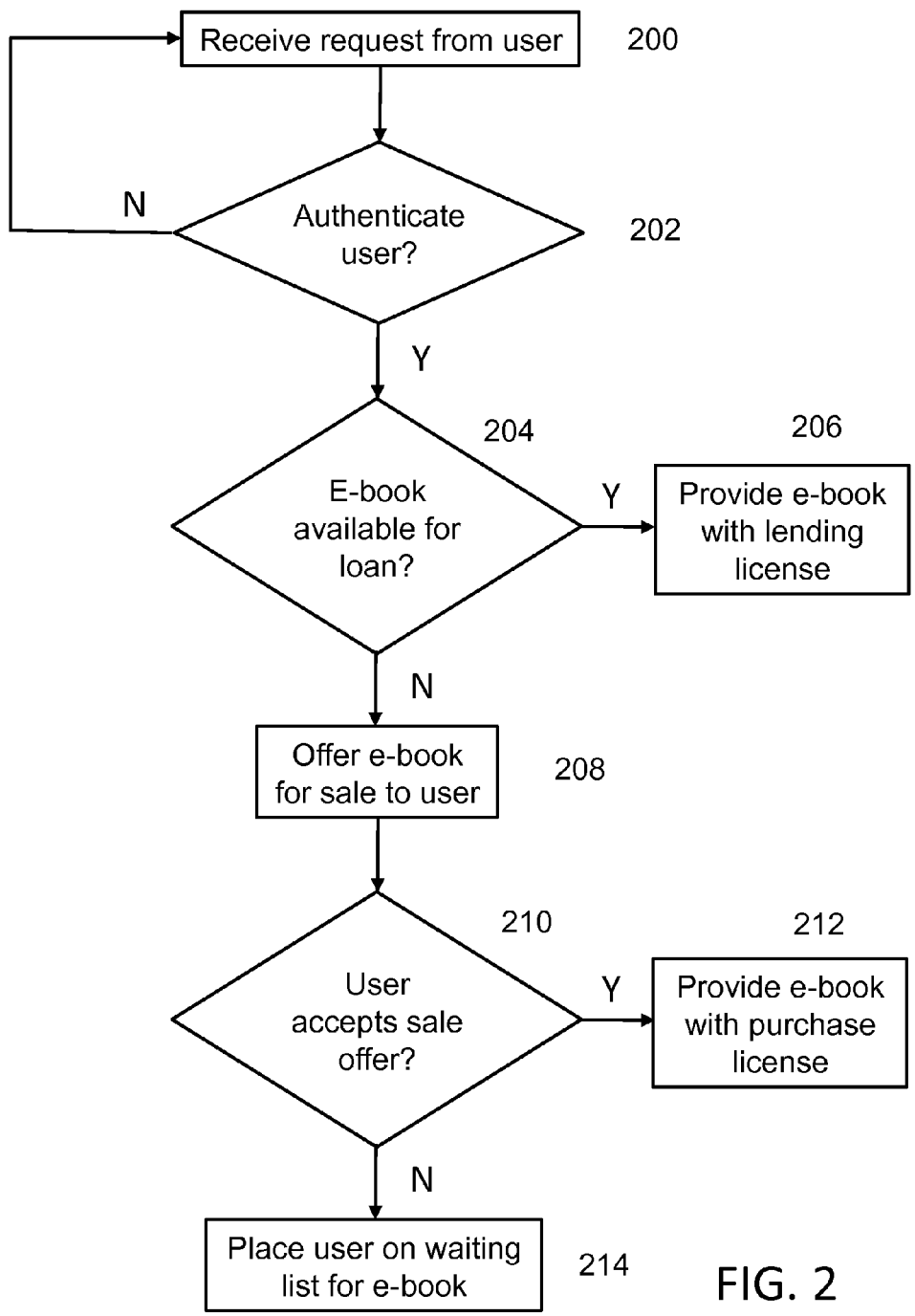
FIG. 2 is a simplified flow diagram showing a method according to an embodiment of the instant invention.

Now referring also to FIG. 2, at 200 the request message is transmitted from the portable electronic device 104 to the processor 122 of the e-book lending library 102 via WAN 124. At 202 a process in execution on the processor 122 extracts the user identification information from the request message, and compares it with library patron data 120 that is stored in data storage system 112. When the user is authenticated successfully as a registered patron, then a process in execution on the processor 122 is enabled for processing e-book loan requests from the user and for providing requested e-books from the e-book lending library 102 to the portable electronic device 104. For instance, a process that is in execution on the processor 122 extracts e-book loan request information from the request message that was received at 200. In the instant example, the e-book loan request information includes an indication of the first e-book. At 204 a process in execution on the processor 122 determines a current lending status of the first e-book as either available for lending or unavailable for lending. If it is determined at 204 that the first e-book is currently available for being loaned, then at 206 a lending license for the first e-book is retrieved from storage system 112 and is provided with the first e-book to the portable electronic device 104 via WAN 124. When it is determined that the first e-book is currently unavailable for being loaned, then at 208 a process in execution on the processor 122 offers to the user an opportunity to purchase the first e-book via the e-book lending library. If the user accepts the offer at 210, then at 212 a purchase license for the first e-book is retrieved from storage system 112 and is provided with the first e-book to the portable electronic device 104 via WAN 124. On the other hand, if the user declines the offer at 210 then at 214 the user is placed on a waiting list for the first e-book.

Optionally, the request to borrow e-books from the e-book lending library 102 is transmitted separately from the portable electronic device 104, subsequent to the user being authenticated as a registered patron. In this optional implementation, the request that is transmitted at 200 includes the user identification information but it does not include a request to borrow a specific e-book.

Optionally, the user is given the opportunity to purchase the first e-book either for personal use, as a gift, or to be donated to the e-book lending library 102. When the user purchases the first e-book for personal use, the first e-book and a purchase license for the first e-book are downloaded to an electronic device associated with the user as described above. When the user purchases the first e-book to be donated to the e-book lending library 102, one additional instance of the first e-book is added to the e-book lending library 102. By way of a specific and non-limiting example, one additional lending license for the first e-book is stored in data storage system 112. Optionally, the user is granted the privilege of borrowing the first e-book immediately using the one additional lending license, either for a predetermined finite period of time or for a period of time exceeding the established e-book lending period. Once the user "returns" the first e-book, then the additional instance of the first e-book is available to be loaned to any other patron that requests the first e-book subsequently. Optionally, the user is billed differently for the purchase of the first e-book in dependence upon whether the first e-book is purchased for personal use or to be donated to the e-book lending library 102. For instance, a premium of 300% to 400% is charged when the first e-book is purchased for being donated to the e-book lending library 102.

Figure 3:
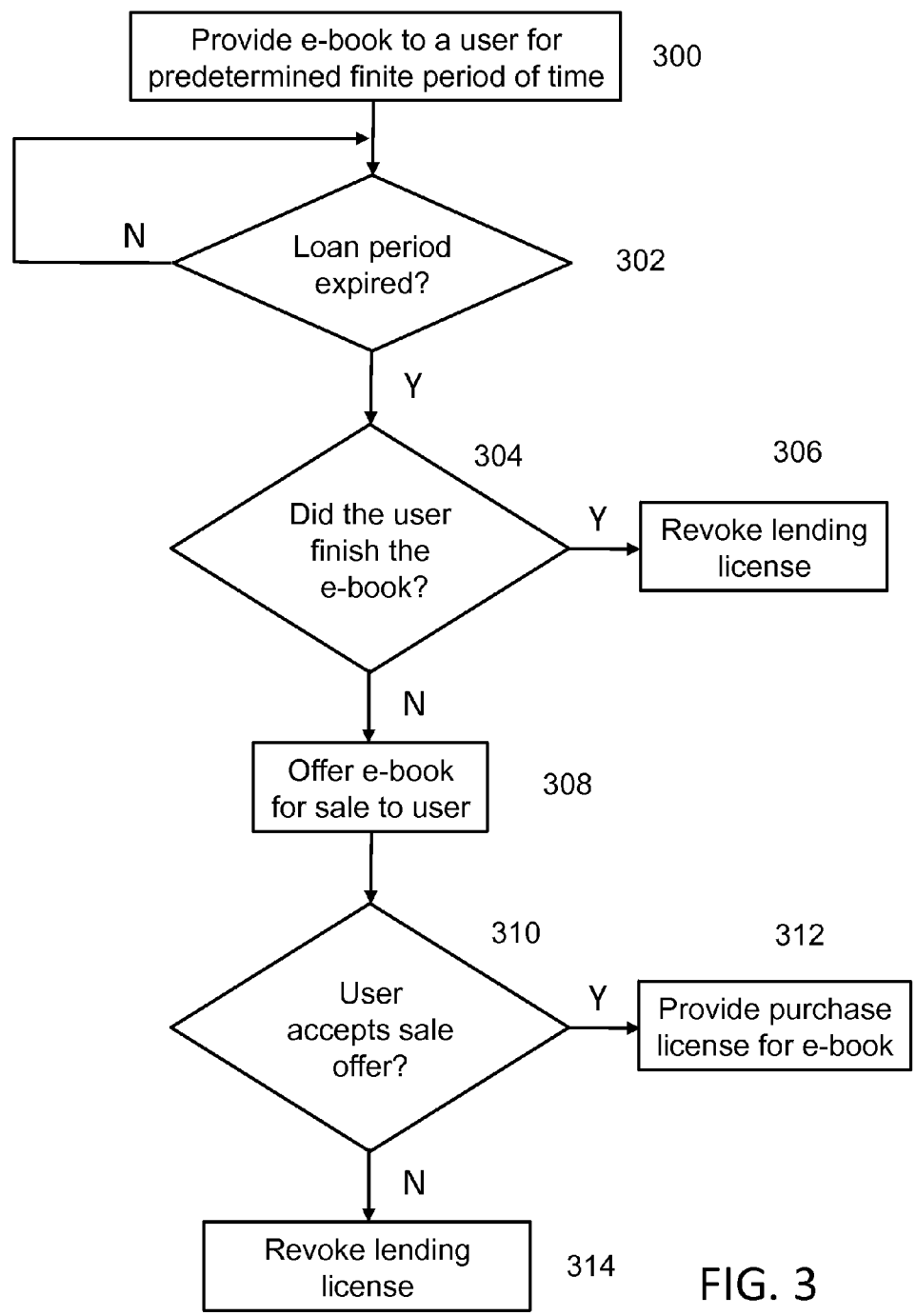
FIG. 3 is a simplified flow diagram showing a method according to an embodiment of the instant invention; and, FIG. 4 is a simplified flow diagram showing a method according to an embodiment of the instant invention.

Referring now to FIG. 3, shown is a simplified flow diagram of a method according to another embodiment of the instant invention. The method of FIG. 3 is initiated at 300 when a user borrows a first e-book from the e-book lending library 102. In particular, the first e-book is loaned to the user for a predetermined finite period of time. When it is determined at 302 that the loan period for the first e-book has expired, then at 304 a determination is made automatically as to the user's reading progress through the first e-book. If it is determined that the user has finished reading the first e-book, then at 306 the lending license is revoked and the first e-book is "returned" automatically to the e-book lending library 102. On the other hand, if it is determined that the user has other than finished reading the first e-book, then at 308 the user is offered an opportunity to purchase the first e-book via the e-book lending library. If the user accepts the offer at 310, then at 312 a purchase license for the first e-book is retrieved from storage system 112 and is provided to the portable electronic device 104 via WAN 124. On the other hand, if the user declines the offer at 310 then at 314 the lending license is revoked and the first e-book is "returned" automatically to the e-book lending library 102.

Optionally, the user is given the opportunity to purchase the first e-book for personal use, as a gift, or to be donated to the e-book lending library 102. When the user purchases the first e-book for personal use, a purchase license for the first e-book is downloaded to an electronic device associated with the user as described above. When the user purchases the first e-book to be donated to the e-book lending library 102, one additional instance of the first e-book is added to the e-book lending library 102. By way of a specific and non-limiting example, one additional lending license for the first e-book is stored in data storage system 112. Optionally, the user is granted the privilege of borrowing the first e-book immediately using the one additional lending license, either for a predetermined finite period of time or for a period of time exceeding the established e-book lending period. The lending license currently associated with the first e-book is returned to the e-book lending library 102 and is available for use by another user. Thus, the user may complete the first e-book even if another user has placed a hold on the first e-book. Once the first e-book is "returned," then the additional instance of the first e-book is available to be loaned to any other patron that requests the first e-book subsequently. Optionally, the user is billed differently for the purchase of the first e-book in dependence upon whether the first e-book is purchased for personal use or to be donated to the e-book lending library 102. For instance, a premium of 300% to 400% is charged when the first e-book is purchased for being donated to the e-book lending library 102.

Figure 4:
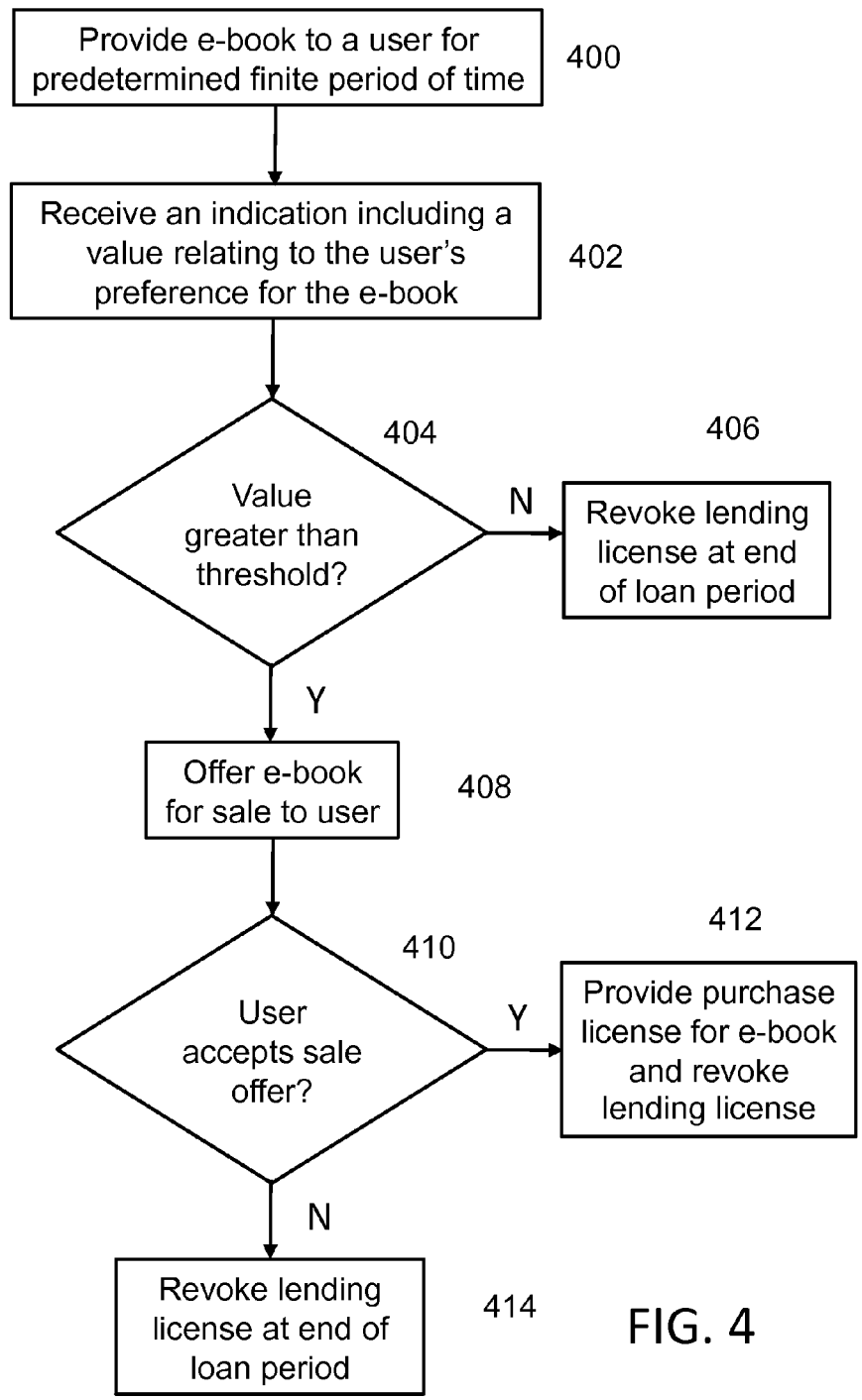

Referring now to FIG. 4, shown is a simplified flow diagram of a method according to another embodiment of the instant invention. The method of FIG. 4 is initiated at 400 when a user borrows a first e-book from the e-book lending library 102. In particular, the first e-book is loaned to the user for a predetermined finite period of time—the loan period—such as for instance 14 days or 21 days. At 402, some time after the first e-book is loaned to the user, a signal is received at the e-book lending library. For instance, the signal is provided to the e-book lending library 102 from the portable electronic device 104 via WAN 124, in either an automated or a manual fashion. The signal includes a value relating to the user's preference for the first e-book. For instance, the value is indicative of a user rating of 4 on a scale from 0 to 5. At 404 it is determined if the value is greater than a predetermined threshold value. If the value is not greater than the predetermined threshold value then at 406 the lending license for the first e-book is revoked at the end of the loan period and the first e-book is returned automatically to the e-book lending library. If the value is greater than the predetermined threshold value then at 408 the user is offered an opportunity to purchase the first e-book via the e-book lending library. If the user accepts the offer at 410, then at 412 a purchase license for the first e-book is retrieved from storage system 112 and is provided to the portable electronic device 104 via WAN 124. The lending license is revoked at the same time the purchase license is provided. On the other hand, if the user declines the offer at 410 then at 414 the lending license is revoked at the end of the loan period, and the first e-book is "returned" automatically to the e-book lending library 102.

Optionally, the signal is provided to the e-book lending library 102 from the portable electronic device 104 via WAN 124 upon expiration of the predetermined finite period of time. This may be performed automatically by generating a value on the basis of information that is collected by the portable electronic device 104 as the user is reading the first e-book. For instance, the speed or constancy with which the user reads the first e-book may be used to infer a stronger preference for the first e-book, therefore resulting in a high value, whilst slow progress or long gaps between reading sessions may be used to infer a weaker preference for the first e-book, therefore resulting in a relatively lower value. Alternatively, the value is generated based on one or more ratings that are provided by the user, in which case the signal is transmitted either in an automated or a manual fashion. Further alternatively, the value is generated based on ratings that are provided by contacts associated with the user. For instance, if the user's family members have read the first e-book and provided ratings, then a value relating to the user's preference may be inferred based on the family members' ratings. In this case, the signal is transmitted to the e-book lending library from devices that are associated with other than the user. Optionally, the family member's ratings are weighted based on similarities to the user's ratings for a set of other e-books.

Alternatively, the converse is also possible. That is to say, in an e-book store when it is determined that a requested e-book is available for being loaned from an e-book lending library, a user is offered an opportunity to borrow the e-book from the e-book lending library instead of buying it from the e-book store.

Numerous other embodiments may be envisaged without departing from the scope of the invention.

What is claimed is:

1. A method comprising:
   providing an e-book lending library on at least a server comprising an electronic library interface and an electronic database containing at least one of license data relating to a plurality of e-books and a plurality of e-books;
   receiving at the e-book lending library via a communication network a first signal transmitted from a user, the first signal comprising a request to borrow a first e-book of the plurality of e-books for a predetermined finite period of time;
   determining, by a processor, a current lending status of the first e-book as one of available for lending and unavailable for lending; and,
   based on the determination that the first e-book is unavailable for lending, transmitting, by the processor, to the user via the communication network a second signal, the second signal comprising an offer to sell to the user the first e-book via the e-book lending library.

2. A method according to claim 1, comprising associating with the user an electronic device, wherein the electronic device generates the first signal for transmission to the library in dependence upon receiving an indication from the user for requesting the first e-book.

3. A method according to claim 2, comprising displaying to the user via a display portion of the electronic device the offer to sell the first e-book.

4. A method according to claim 2, comprising providing via the communication network a purchase license for use with a previously downloaded copy of the first e-book stored on the electronic device.

5. A method according to claim 2, comprising providing via the communication network a file including a copy of the first e-book and a purchase license for the first e-book.

6. A method according to claim 1, wherein one additional instance of the first e-book is added to the e-book lending library when the user accepts the offer to purchase the first e-book via the e-book lending library.

7. A method according to claim 6, wherein after the one additional instance of the first e-book is added to the e-book lending library, the user is authorized to borrow the first e-book for a period of time exceeding the predetermined finite period of time.

8. A method according to claim 6, wherein at the time the one additional instance of the first e-book is added to the e-book lending library, the user is authorized to borrow the first e-book for a period of time exceeding the predetermined finite period of time.

9. A method according to claim 6, wherein at the time the one additional instance of the first e-book is added to the e-book lending library, the user is authorized to borrow the first e-book for the predetermined finite period of time.

10. A method according to claim 1, wherein offering to the user an opportunity to purchase the first e-book via the e-book lending library comprises offering to the user an option either to purchase one additional instance of the first e-book to be donated to the e-book lending library, or to purchase the first e-book for personal use.

11. A method according to claim 10, comprising billing the user an amount that is determined in dependence upon which purchase option is selected.

12. A method according to claim 1, comprising automatically routing the user to a book-store interface via the library interface, in dependence upon the user accepting the offer.

13. A method according to claim 1 comprising:
    determining an approximate wait time until the e-book is available for lending and, in dependence upon the approximate wait time adjusting a price of the offer to sell.

14. A method according to claim 1 comprising:
 determining an approximate wait time until the e-book is available for lending and, in dependence upon the approximate wait time offering a shorter wait time for a fee, the fee less than a price of the offer to sell.

15. A method according to claim 1 comprising:
 determining based on at least one of the license and the e-book an offer for the user, the offer including at least the offer to sell and an other offer based on data associated with at least one of the license and the e-book, and providing the other offer to the user.

16. A method comprising:
 displaying to a user via a display portion of an electronic device a plurality of different e-book selections, each different e-book selection being representative of an e-book contained in an e-book lending library;
 receiving from the electronic device via a communication network a first signal indicative of user selection of one of the displayed e-book selections, the first signal comprising a request to borrow from the e-book lending library an e-book that is represented by the selected one of the displayed e-book selections;
 determining, by a processor, if the requested e-book is currently available for being loaned; and,
 based on the determination that the requested e-book is not currently available for being loaned, transmitting, by the processor, to the user via the communication network a second signal, the second signal comprising an offer to sell to the user the requested e-book.

17. A method according to claim 16, comprising displaying to the user via the display portion of the electronic device the offer to sell the requested e-book.

18. A method according to claim 16, comprising providing via the communication network a purchase license for use with a previously downloaded copy of the requested e-book stored on the electronic device.

19. A method according to claim 16, comprising providing via the communication network a file including a copy of the requested e-book and a purchase license for the requested e-book.

20. A method according to claim 16, wherein one additional instance of the requested e-book is added to the e-book lending library when the user accepts the offer to purchase the requested e-book via the e-book lending library.

21. A method according to claim 20, wherein after the one additional instance of the requested e-book is added to the e-book lending library, the user is authorized to borrow the requested e-book for a predetermined finite period of time.

22. A method according to claim 20, wherein at the time the one additional instance of the requested e-book is added to the e-book lending library, the user is authorized to borrow the requested e-book for a period of time exceeding a predetermined finite period of time that is normally associated with lending of a book from the e-book lending library.

23. A method according to claim 20, wherein after the one additional instance of the requested e-book is added to the e-book lending library, the user is authorized to borrow the requested e-book for a period of time exceeding a predetermined finite period of time that is normally associated with lending of a book from the e-book lending library.

24. A method according to claim 16, wherein offering to the user an opportunity to purchase the requested e-book via the e-book lending library comprises offering to the user an option either to purchase one additional instance of the requested e-book to be donated to the e-book lending library, or to purchase the requested e-book for personal use.

25. A method according to claim 24, comprising billing the user an amount that is determined in dependence upon which purchase option is selected.

26. A method according to claim 16 comprising:
 communicating with at least a bookseller to determine information about purchasing of the e-book from the at least a bookseller; and,
 using the information to formulate the offer to sell.

27. A method according to claim 16 comprising:
 upon the user selecting to purchase the e-book, communicating with at least a bookseller to initiate a transaction between the user and the bookseller.

28. A system comprising:
 a first storage element for storing e-book content relating to a plurality of different e-books, the plurality of different e-books comprising an e-book lending library;
 a second storage element for storing at least one lending license in association with each e-book of the plurality of different e-books;
 a third storage element for storing at least one purchase license in association with each e-book of the plurality of different e-books; and,
 a processor for, in response to a request from a user to borrow one of the plurality of different e-books from the e-book lending library, determining whether a lending license associated with the requested e-book is currently available, and for:
 providing the requested e-book to the user based on a determination that the lending license associated with the requested e-book is currently available; and,
 offering to the user an opportunity to purchase the at least one purchase license associated with the requested e-book based on a determination that the lending license associated with the requested e-book is other than currently available.

29. A method comprising:
 displaying to a user via a display portion of an electronic device a plurality of different e-book selections, each different e-book selection being representative of an e-book contained in an e-book store;
 receiving from the electronic device via a communication network a first signal indicative of user selection of one of the displayed e-book selections, the first signal comprising a request to purchase from the e-book store an e-book that is represented by the selected one of the displayed e-book selections;
 determining, by a processor, if the requested e-book is currently available for being loaned from an e-book lending library; and,
 based on the determination that the requested e-book is currently available for being loaned, transmitting, by the processor, to the user via the communication network a second signal, the second signal comprising an offer to loan to the user the requested e-book from the e-book lending library.

* * * * *